United States Patent [19]

Baron et al.

[11] 4,366,083

[45] Dec. 28, 1982

[54] PROCESS FOR REDUCING CO AND $SO_x$ EMISSIONS FROM CATALYTIC CRACKING UNITS

[75] Inventors: Kenneth Baron, Diamond Bar; Dennis P. McArthur, Yorba Linda, both of Calif.

[73] Assignee: Union Oil Company of California, Los Angeles, Calif.

[21] Appl. No.: 228,267

[22] Filed: Jan. 26, 1981

Related U.S. Application Data

[62] Division of Ser. No. 109,756, Jan. 7, 1980, Pat. No. 4,311,581.

[51] Int. Cl.$^3$ .................. B01J 29/38; B01J 21/20; B01J 23/92; C10G 11/08
[52] U.S. Cl. .................................... 252/416; 252/417
[58] Field of Search ................ 252/416, 417; 208/113, 208/120

[56] References Cited

U.S. PATENT DOCUMENTS

| | | | |
|---|---|---|---|
| 3,808,121 | 4/1974 | Wilson | 208/113 |
| 3,823,092 | 7/1974 | Gladrow | 252/455Z |
| 3,930,987 | 1/1976 | Grand | 208/111 |
| 4,084,960 | 4/1978 | Kay et al. | 75/58 |
| 4,137,151 | 1/1979 | Csicsery | 208/120 |
| 4,146,463 | 3/1979 | Radford et al. | 208/120 |
| 4,153,534 | 5/1979 | Vasalos | 208/120 |
| 4,153,535 | 5/1979 | Vasalos et al. | 208/120 |
| 4,161,400 | 7/1979 | Wilson et al. | 75/58 |
| 4,166,787 | 9/1979 | Blanton, Jr. et al. | 208/120 |
| 4,206,039 | 6/1980 | Vasalos | 208/120 |
| 4,221,677 | 9/1980 | Vasalos et al. | 252/455 Z |
| 4,233,276 | 11/1980 | D'Souza et al. | 423/230 |
| 4,272,358 | 1/1981 | Baron | 208/120 |

FOREIGN PATENT DOCUMENTS

| | | | |
|---|---|---|---|
| 2507343 | 9/1975 | Fed. Rep. of Germany | 252/417 |
| 2032947 | 5/1980 | United Kingdom | 252/462 |

*Primary Examiner*—P. E. Konopka
*Attorney, Agent, or Firm*—Gregory F. Wirzbicki; Dean Sandford

[57] ABSTRACT

Reduction of CO and $SO_x$ emissions from regenerators associated with cyclical fluidized catalytic cracking (FCC) units used to convert hydrocarbon feedstocks into more valuable products is achieved by introducing particles of bastnaesite into the FCC unit. The bastnaesite particles recycle with the catalyst particles successively through a catalytic cracking reaction zone, a stripping zone, and a regeneration zone. The bastnaesite particles react with $SO_x$ produced in the regeneration zone of the FCC unit, thereby lowering the $SO_x$ content of the flue gas discharged therefrom. In the catalytic cracking and stripping zones of the FCC unit, the bastnaesite particles are at least partially reactivated so that upon returning to the regeneration zone yet more $SO_2$ is removed. The bastnaesite particles also aid in lowering CO emissions from the FCC regenerator by catalyzing the reaction between CO and oxygen to yield $CO_2$.

17 Claims, No Drawings

PROCESS FOR REDUCING CO AND SO$_x$ EMISSIONS FROM CATALYTIC CRACKING UNITS

This application is a division of application Ser. No. 109,756, filed Jan. 7, 1980 now U.S. Pat. No. 4,311,581.

BACKGROUND OF THE INVENTION

This invention relates to the reduction of CO and SO$_x$ components in the flue gas discharged from regenerators associated with catalytic cracking units. More particularly, this invention relates to injecting particles of bastnaesite into fluidized catalytic cracking (FCC) units to reduce emissions from the catalyst regenerator.

In the petroleum industry, high boiling hydrocarbon feedstocks are charged to FCC units so that, by contact with a moving bed of catalyst particles, the feedstocks are converted to a more valuable hydrocarbon product, such as gasoline, having a lower average molecular weight and a lower average boiling point than the feedstock from which it was derived. The most typical hydrocarbon feedstock treated in FCC units consists of heavy gas oil, but on occasion such feedstocks as light gas oils, reduced crudes, and even whole crudes are subjected to catalytic cracking to yield low boiling hydrocarbon products.

Catalytic cracking in FCC units is usually accomplished by a cyclic process involving separate zones for catalytic reaction, steam stripping, and catalyst regeneration. The hydrocarbon feedstock is blended with an appropriate amount of catalyst particles, and the mixture so produced is then passed through a catalytic reactor, commonly called a riser, wherein a catalytic cracking reaction zone is maintained such that at a temperature between about 800° and 1100° F. the feedstock is converted into gaseous, lower boiling hydrocarbons. After these lower boiling hydrocarbons are separated from the catalyst in a suitable separator, such as a cyclone separator, the catalyst, now deactivated with coke deposited upon its surfaces, is passed to a stripper. In the stripper, the deactivated catalyst is contacted with steam so as to convert some of the coke to hydrocarbon product vapors, which are then combined with the vapors received from the cyclone separator, and the mixed vapors are then transferred to other facilities for further treatment. Meanwhile, catalyst particles are recovered from the stripper, and because only a small proportion of the coke is removed in the stripper, the catalyst is introduced into a regenerator wherein, by combustion in the presence of an oxygen-containing gas such as air, the remaining, larger proportion of coke is removed and the catalyst reactivated. The cyclic process is then completed by blending the reactivated catalyst particles with the feedstock entering the riser of the FCC unit.

One recognized problem in the conventional FCC process resides in the incomplete combustion in the regenerator. Due to the relatively low temperature of combustion in the regenerator, usually between about 900° and about 1300° F., the flue gas contains carbon dioxide and carbon monoxide in a ratio of 0.8:1 to about 10:1, CO$_2$:CO, with the carbon monoxide concentration often being as high as 15 mole percent. Such high concentrations of carbon monoxide are a source of concern inasmuch as carbon monoxide is a pollutant, and this concern has recently resulted in numerous methods to reduce the amount of carbon monoxide discharged from FCC regenerators and the like. In general, these methods aim to reduce the polluting effects of carbon monoxide by incorporating into the cracking catalyst particles metal components that are active for catalyzing the reaction of CO with oxygen at the relatively low temperatures encountered in FCC regenerators. Alternatively, the metal CO oxidation promoter may be incorporated on particles having substantially no catalytic cracking activity that circulate in the FCC unit with the catalyst particles. The metal promoters useful for such purposes include the Group VIII metals and rhenium, as disclosed in U.S. Pat. No. 4,072,600, chromium, as disclosed in U.S. Pat. No. 2,647,860, Group IB, IIB, VIB, VIIB, and VIII metals, as disclosed in U.S. Pat. No. 3,364,136, and certain rare earth metals, such as cerium, as taught in Netherlands Pat. No. 7300884, and lanthanum, as taught in U.S. Pat. No. 4,137,151.

The processes described in the foregoing prior art references usually entail substantial costs due to the expense involved in impregnating selected metals onto catalyst particles. For example, if a certain rare earth element is desired as the CO oxidation promoter, substantial costs are incurred in extracting the selected rare earth element from an ore and separating it from the other metals also extracted from the ore. In addition, added costs are involved in modifying cracking catalysts so as to include the selected rare earth element thereon. Usually, the selected metal is incorporated upon the catalyst particles by an impregnation-calcination procedure which substantially increases the cost in manufacturing a cracking catalyst. Thus, the prior art approach to reducing CO emissions from FCC units is costly and one aim of the art has been to reduce such costs and at the same time obtain significant reductions in CO emissions.

In addition to the problem of reducing CO emissions from FCC units, another major pollution problem is presented when the hydrocarbon feedstock contains organic sulfur compounds. Ideally, the sulfur compounds in a feedstock treated in an FCC unit are converted to H$_2$S in the catalytic reaction and stripping zones so that all the contained sulfur in the feedstock is recovered as H$_2$S with the product vapors and later separated therefrom by contact with an aqueous alkanolamine solution. But in practice, it has been found that some sulfur components remain (or are converted to forms which remain) with the coke on the deactivated catalyst recovered from the stripper. Hence, when the coke is combusted in the regenerator, a flue gas containing SO$_x$ compounds is produced.

The flue gas, if untreated, is a source of pollution. Although about 90–95% of the sulfur compounds entering an FCC unit with the feedstock are ultimately removed as H$_2$S and other gaseous sulfur compounds, the remaining 5–10% left with the coke and converted to SO$_x$ compounds in the regenerator represents a significant environmental and engineering problem. For a typical FCC unit handling a feedstock containing about 1.5 weight percent sulfur components (calculated as elemental sulfur) fed at a rate of about 50,000 barrels per day, the amount of SO$_x$ compounds discharged from the regenerator in one day is between about 3.0 and 10 tons (calculated as SO$_2$).

Because of the concern created by the discharge to the atmosphere of SO$_x$ compounds in such large quantities, various methods have been devised to reduce SO$_x$ emissions from FCC units to environmentally tolerable levels. Recently, attempts have been made to reduce such $SO_x$ emissions by recycling with the catalyst particles in the FCC unit a metal-containing component, commonly called a "sulfur getter," that reacts in the regenerator with the gaseous $SO_x$ compounds to yield a solid sulfur compound. The produced sulfur compound is then reconverted to the active "sulfur gettering" form by passage through the riser and stripper wherein the solid sulfur compounds are decomposed to release $H_2S$. The release $H_2S$ is then recovered with the low-boiling hydrocarbons produced in the stripper and riser and then separated from said low-boiling hydrocarbons, as stated before, by contact with an alkanolamine solution.

One method illustrating the use of a "sulfur getter" is described in U.S. Pat. No. 3,835,031, wherein magnesium oxide is incorporated on the catalyst for the purpose of scavenging $SO_x$ compounds. In the regenerator, the magnesium oxide reacts with the $SO_x$ compounds to produce magnesium sulfate, thereby preventing the release of $SO_x$ compounds from the regenerator. As the catalyst particles are recycled through the catalytic cracking and steam stripping zones maintained in the riser and stripper, respectively, the magnesium sulfate is converted back to magnesium oxide while the contained sulfur is released as hydrogen sulfide and collected with the low boiling hydrocarbon products. Thus, the catalyst particles, when recycled to the regenerator again, contain a magnesium compound (i.e., magnesium oxide) in an active form for removing $SO_x$.

Similar processes have been taught in U.S. Pat. Nos. 3,699,037, 4,071,436, 4,137,151, 4,146,787, and 4,153,535. These references disclose many metals for reducing the amount of $SO_2$ discharged from FCC regenerators. Usually, the metals are incorporated onto the catalyst itself, but some references also disclose FCC processes wherein particles separate from the catalyst are introduced into the FCC unit and recycled with the catalyst to control sulfur oxides emissions. U.S. Pat. No. 4,071,436, for example, teaches a process wherein particles of reactive alumina are circulated with the catalyst particles. And U.S. Pat. No. 4,146,463 discloses thirteen specific metals plus the Group II and rare earth metals for removing $SO_2$ produced in FCC regenerators, and the metals so disclosed are taught as useful when impregnated on the catalyst itself, incorporated on an insert substrate (i.e., inert for cracking hydrocarbons), or utilized as a powdered oxide.

One difficulty residing in the foregoing processes is that the "sulfur getter" material must be prepared by processes involving substantial manufacturing costs. An object of the present invention, therefore, is to improve upon the prior art processes by utilizing an abundant and inexpensive material, namely bastnaesite, as the "sulfur getter," thereby substantially reducing the cost of removing $SO_2$ from FCC regenerators. It is yet another object of the invention to introduce bastnaesite into the catalyst cracking cycle for the purpose of simultaneously lowering $SO_x$ and CO emissions from the regenerators of FCC units. It is yet another object of the invention to reduce $SO_x$ and CO emissions from FCC regenerators and the like by introducing bastnaesite, either in a particulate form separate from the catalyst or in a form physically attached to the catalyst, into the FCC cycle for the purpose of scavenging $SO_x$ and/or catalyzing the conversion of CO to $CO_2$ in the FCC regenerator. These and other objects will become more apparent in view of the following description of the invention.

SUMMARY OF THE INVENTION

This invention is directed to preventing or reducing CO and/or $SO_x$ emissions from catalytic cracking processes in which petroleum feedstocks are refined into valuable hydrocarbon products. The invention comprises introducing particles of bastnaesite into the catalytic cracking cycle to react with sulfur oxides produced in the regeneration zone and simultaneous therewith to catalyze the conversion of CO to $CO_2$. The bastnaesite particles may be introduced into the FCC unit in a manner such that the bastnaesite particles are admixed with the cracking catalyst particles but remain a separate entity therefrom, or the bastnaesite particles may be physically incorporated into the cracking particles, as by making a minor change in the preparation of the cracking catalyst.

The invention is especially designed for lowering the carbon monoxide and sulfur oxides emissions from FCC units and other cyclical catalytic cracking processes wherein the catalyst particles are circulated successively through catalytic cracking, steam stripping, and regeneration zones. With respect to reducing sulfur oxides emissions, the bastnaesite particles are believed firstly to react with $SO_x$ compounds, thereby reducing the amount of $SO_x$ compounds discharged with the flue gas leaving the regenerator. Subsequently, the solid sulfur compounds are decomposed to produce $H_2S$ during passage through the catalytic cracking and steam stripping zones of the cracking cycle, thereby activating the bastnaesite particles once again for removing $SO_x$ compounds in the regeneration zone. With respect to reducing CO emissions, the bastnaesite particles in the regenerator have catalytic oxidation properties and are active for reacting CO with available oxygen to produce $CO_2$.

All references herein to $SO_x$ compounds are directed to one or more sulfur components selected from the group consisting of $SO_2$ and $SO_3$.

DETAILED DESCRIPTION OF THE INVENTION

In accordance with this invention, the fluidized catalytic cracking (FCC) process, or other cyclic catalytic cracking process in which a hydrocarbon feedstock is refined to produce low-boiling hydrocarbon products by passage through a catalytic cracking reaction zone, is improved by introducing bastnaesite particles into the cyclic process to reduce the amount of $SO_x$ and CO compounds emitted with the flue gases discharged from the regenerator. Bastnaesite is a rare earth fluorocarbonate mineral usually found in nature in contact with zinc loads. As the raw mineral, bastnaesite contains about 65 to 80% by weight of assorted rare earth elements (calculated as the rare earth oxides), and at present is the primary industrial source for the light rare earth elements. In particular, although containing significant proportions of praseodymium, neodymium, samarium, europium, and gadolinium, bastnaesite primarily contains lanthanum and cerium, usually in proportions exceeding 80% of the total rare earth content of the mineral.

It will be understood herein that bastnaesite being a chemically reactive mineral undergoes chemical changes in the catalytic cracking unit. Similarly, if bastnaesite is utilized in the invention in a pretreated form, such as in a steamed, leached, or calcined form, it may have a somewhat different composition than bastnaesite as found in nature. For example, it has been found when natural bastnaesite is calcined in air at a temperature around 700° C. that the mineral undergoes a chemical reaction such that some of the rare earth fluorocarbonates therein are converted to rare earth oxyfluorides. Also, natural bastnaesite may be leached with hydrochloric acid to separate strontium and barium therefrom. Thus, it is within the scope of the invention to use bastnaesite in modified forms, and for purposes herein, the term "bastnaesite" is meant to include not only bastnaesite as found in nature (i.e., a natural bastnaesite) but also any material having a distribution of rare earth elements to total rare earth elements substantially similar to bastnaesite. A typical chemical analysis of natural bastnaesite reveals that the proportion of individual rare earth elements (calculated as the oxide) to the total rear earth element content (calculated as the oxides) falls within the following ranges: 45 to 55 wt. % $CeO_2$, 29 to 35 wt. % $La_2O_3$, 11 to 15 wt. % $Nd_2O_3$, 2.5 to 5.5 wt. % $Pr_2O_3$, 0.3 to 0.7 wt. % $Sm_2O_3$, 0.1 to 0.3 wt. % $Gd_2O_3$, 0.05 to 0.15 wt. % $Eu_2O_3$, and 0.05 to 0.35 wt. % of other rare earth elements, calculated as $RE_2O_3$. For purposes herein, a material is considered to be bastnaesite when its proportions of individual rare earth elements (in elemental or combined forms) to total rare earth elements (in elemental or combined forms) are substantially within the foregoing ranges.

In accordance with this invention, bastnaesite particles are introduced into a fluid catalytic cracking unit, usually by admixing the bastnaesite particles with the catalyst particles and then blending the resulting mixture into the unit at a convenient location. The amount of bastnaesite so added will vary with the individual cracking unit and with the amount of CO and $SO_x$ desired to be removed from the regenerator flue gas. Usually, the bastnaesite particles are added at a rate such that, of the total amount of catalyst particles and bastnaesite particles recirculating through the unit, 5.0 to 20% of such particles constitute bastnaesite.

The average size of the bastnaesite particles introduced into the FCC unit is most preferably the same as that of the catalyst particles themselves, i.e., about 20 to 80 microns in diameter. However, at the present time, bastnaesite is produced in abundance in a mixture of particle sizes ranging between about 1 and 65 microns. Accordingly, it is a preferred embodiment of the invention to introduce a mixture of differently-sized bastnaesite particles ranging between about 1 and about 65 microns into an FCC unit for the purpose of reducing CO and/or $SO_x$ emissions.

The process of the invention is directed to lowering the amount of gaseous pollutants discharged from regenerators of FCC units and the like treating liquid hydrocarbon feedstocks, especially those containing sulfur. Typical feedstocks converted to lower boiling hydrocarbons in such units include sulfur-containing gas oils, residual fractions, oil crudes, naphthas, and the like. The total concentration of sulfur in most FCC feedstocks, whether the sulfur is present in elemental or combined forms or both, is between about 0.1 and 3.0 percent by weight (as sulfur). Usually, almost all the contained sulfur in the hydrocarbon feedstock is present as organic sulfur compounds rather than free sulfur or inorganic compounds thereof.

In the process of the invention, any suitable cracking catalyst known in the art to have cracking activity at elevated temperatures, such as above about 750° F., may be utilized, but the preferred catalysts are the high-activity fluidizable cracking catalysts. Generally, fluidizable cracking catalysts are in particulate form and comprise an inorganic, porous refractory oxide, such as silica-alumina. Usually, the cracking catalyst also comprises crystalline aluminosilicates, such as X and Y type zeolites. Preferred catalysts, however, comprise the Y type zeolite in a matrix of a porous, inorganic refractory oxide, such as silica-alumina or "beneficiated" natural clays, i.e., clays from which deleterious metal components have been removed. The crystalline aluminosilicate zeolites utilized in cracking catalysts may be rendered substantially more active for cracking hydrocarbons by ion exchange, a method well-known in the art by which the sodium and other alkali metal ions in the aluminosilicate structure are exchanged for rare earth element ions, ammonium ions, hydrogen ions, or combinations thereof. Such ion exchange methods usually reduce the sodium and other alkali metal ion content of the zeolites to a very low proportion, usually less than about 4.0% by weight (calculated as the alkali metals). The most typical and preferred catalyst for use in the invention comprises a crystalline aluminosilicate zeolite dispersed in silica-alumina, with the alumina proportion of the finished catalyst being between about 25 and 60 percent by weight and the zeolite proportion being between about 5 and 20 percent by weight.

In the riser, the circulating bastnaesite and catalyst particles are mixed with the incoming feedstock in a fluidized catalytic cracking reaction zone. Conditions in the riser are selected from those conventionally used to produce the required product from the feedstock. Typically, reaction temperatures and pressures are between about 750° and 1150° F. and 14 and 40 psig, respectively. Fluidizing velocity will usually be in the range of 20 to about 60 feet per second, and the residence time of the catalyst-feedstock-bastnaesite blend within the riser is between about 2 and 60 seconds. The weight ratio of catalyst to feedstock will usually vary in the 2:1 to 15:1 range, and, preferably, the riser itself comprises a reaction vessel in which the blend of catalyst particles, hydrocarbon feedstock, and bastnaesite is fed vertically and concurrently. Also preferably, the ratio of height to average diameter of the reaction vessel comprising the riser is at least 20, and most preferably at least 35.

Under the above conventional fluid catalytic cracking conditions, and with the blend of feedstock, bastnaesite, and catalyst particles moving cocurrently through the reaction zone, the feedstock is converted in the riser into valuable hydrocarbon products of lower average molecular weight and of lower average boiling point. Some of the feedstock, however, is converted to coke, which accumulates upon the surfaces of the catalyst particles and thereby deactivates such catalyst particles for further cracking of hydrocarbons into product hydrocarbons. Although much of the sulfur present in the original feedstock is largely recovered with the product hydrocarbon vapors in the form of $H_2S$ and sulfur-containing hydrocarbonaceous vapors, a significant proportion of the sulfur remains in various organic forms with the coke deposited on the catalyst particles. Usually, the concentration of sulfur in combined and elemental forms in the coke ranges between about 0.5 and 12.0 percent by weight (as sulfur).

The materials withdrawn from the riser include product oil vapors, hydrogen sulfide, deactivated catalyst particles, and bastnaesite particles. In a suitable separation zone, such as a cyclone separator, the product hydrocarbon vapors and hydrogen sulfide are separated from the deactivated catalyst and bastnaesite particles and sent to conventional processing facilities for removing the hydrogen sulfide from the product vapors. The catalyst and bastnaesite particles, however, are delivered to a stripper where, in the presence of a stripping gas such as nitrogen or steam, with steam being preferred, the coke on the catalyst is partially converted to valuable hydrocarbon vapors, while some of the sulfur compounds within the coke are partially converted to $H_2S$. Conditions within the stripper are preferably maintained so as to recover as much $H_2S$-containing hydrocarbon product vapors as is economically possible. Usually, the temperature within the stripping vessel is held in the 850° to 1050° F. range while pressures are suitably maintained at between about 25 and about 50 psig.

After being transferred to a suitable separator, such as a cyclone separator, the stripped catalyst particles and the bastnaesite particles are separated from a product gas containing hydrocarbon vapors and $H_2S$. The stripped catalyst is then transferred to a regenerator wherein, by contact at elevated temperatures in the 900° to 1400° F. range with a free oxygen-containing gas, such as air, passed countercurrently to the stripped catalyst, the coke not converted to product vapors in the stripper is combusted, thereby removing it from the catalyst particles. When the coke is removed from the catalyst particles such that said particles contain coke in a proportion less than about 0.5 catalyst weight percent, preferably less than about 0.2 catalyst weight percent, the catalyst particles are restored to an acceptably active state and are recycled to the riser. (As calculated herein, catalyst weight percent refers to the percentage proportion of a substance on the surfaces of catalyst particles to the weight of the catalyst particles themselves, exclusive of any material thereon. Thus, for example, if 100 lbs. of catalyst particles contained 1 lb. of coke on the surfaces thereof, the coke would be present in a proportion of 1 catalyst weight percent.)

Most of the catalyst particles recovered from the regenerator are recycled to the riser for use therein to crack hydrocarbons, but some is continuously removed from the FCC unit because, after many cycles of operation, the catalyst particles gradually lose activity. Thus, in a typical FCC unit, about 1 to 5 percent of the catalyst inventory is replaced by fresh catalyst each day, and concomitantly therewith, bastnaesite particles are fed to the unit to replace those removed with the catalyst particles and thus maintain the proportion of bastnaesite particles to bastnaesite plus catalyst particles in the unit at a specified, desired level sufficient to reduce regenerator $SO_x$ and/or CO emissions below the amount produced by a similarly operating unit but circulating only cracking catalyst particles.

Normally, the amount of $SO_x$ compounds discharged from a conventional regenerator by the conversion of the sulfur in the combusted coke to $SO_2$ and $SO_3$ is between 3 and 30 tons per day (calculated as $SO_2$) while the amount of CO discharged is usually between about 50 and 300 tons per day, depending upon the size of the FCC unit, the concentration of sulfur within the coke, and the operating conditions of the regenerator. But due to the presence of the bastnaesite particles, the amount of $SO_x$ discharged on a mass per hour basis with the flue gases is substantially reduced by the chemical reaction of the $SO_x$ with the bastnaesite to produce solid sulfur compounds within the bastnaesite particles. Similarly, the amount of CO discharged with the flue gases when bastnaesite is present in the FCC unit is substantially reduced, the bastnaesite acting as a catalyst for the conversion of CO to $CO_2$ in the presence of free oxygen. The amount by which the CO and $SO_x$ pollutants will be lowered for a given catalytic cracking unit will depend upon such factors as the size of the unit, the amount of bastnaesite employed, and the conditions of operation. In one embodiment of the invention described more fully hereinafter in the Comparative Example, $SO_x$ was reduced by more than 75% (from 700 ppmv to about 140 ppmv) and CO from 1.30 vol.% to about 0.9 vol.% in comparison to the same unit operating in essentially the same manner but without the presence of bastnaesite particles among the recirculating catalyst particles.

One factor having an effect on the amount by which $SO_x$ and CO emissions are decreased is the nature of the bastnaesite itself. In the most highly preferred embodiment of the invention, natural bastnaesite particles rather than bastnaesite particles treated by steaming, leaching, calcining, or the like are introduced into the FCC cycle, preferably by introduction directly into the regenerator in admixture with fresh catalyst particles. Natural bastnaesite has been found to have a substantially higher activity for reducing $SO_x$ and CO emissions than is the case for bastnaesite particles subjected to steaming prior to introduction into the FCC unit, and it is believed that natural bastnaesite would also perform more effectively than other modified or treated forms of bastnaesite. Accordingly, in the most highly preferred embodiment of the invention, untreated, natural bastnaesite is fed to the FCC regenerator for the purpose of reducing $SO_x$ and CO emissions.

An important advantage in the invention is that the bastnaesite particles, once they have removed $SO_x$ compounds in the regenerator, are subsequently regenerated in the riser and/or stripper to form once again active for removing $SO_x$ compounds from the gases produced in the regenerator. In other words, the bastnaesite particles, as they continuously recycle through the riser, stripper, and regenerator, alternately remove $SO_x$ compounds from the regenerator flue gases and subsequently release them in the riser and stripper in the form of $H_2S$, the $H_2S$ then being removed with the other gases produced in the riser and stripper. The bastnaesite particles thus undergo alternate changes in chemical form, involving oxidation reactions in the regenerator and reduction and/or hydrolysis reactions in either the riser or stripper or both. In the regenerator, the bastnaesite particles are believed to react with $SO_x$ compounds to produce solid compounds containing both sulfur and rare earth element atoms and thereby reduce the amount of $SO_x$ compounds discharged from the regenerator with the flue gas. In the riser, at least some of the solid compounds containing both rare earth element and sulfur atoms release $H_2S$ and are thereby converted to forms suitable for subsequently removing $SO_x$ compounds in the regenerator. Reactions similar to those in the riser may also take place in the stripper, resulting in the release of the sulfur contained in the bastnaesite as $H_2S$ and the rejuvenation of the bastnaesite to a form more active for removing $SO_x$ compounds in the regenerator.

The following Comparative Example, which is provided for the purpose of illustrating the improved performance obtainable in the invention and not to limit the scope thereof, demonstrates the superior reductions of CO and $SO_x$ in regenerator flue gases obtained by introducing bastnaesite into an FCC unit.

COMPARATIVE EXAMPLE

In a first experiment, a sulfur-containing gas oil feedstock having the chemical and physical properties shown in Table I was fed to a cyclical catalytic cracking unit of pilot plant size at the rate of about 1300 gm/hr. Circulating through the catalytic cracking reaction zone, the stripping zone (utilizing nitrogen as the stripping gas), and the regeneration zone of the unit were about 3800 gm. of commercial cracking catalyst particles pretreated by steam to lower the activity thereof to a stabilized level. The cracking catalyst was HEZ-53 marketed by Houdry Division of Air Products and Chemicals, Inc., and the rate at which the catalyst particles were circulated through the unit was 180 gm/min. Fluidizing conditions were maintained in the catalytic cracking reaction zone, and the temperature and pressure utilized therein were about 965° F. and about 20 psig, respectively.

After steady state conditions had been achieved, the flue gas emitted from the regenerator was analyzed for $SO_x$, CO, and $CO_2$, and samples of the catalyst particles entering and leaving the regeneration vessel were taken and analyzed by appropriate techniques to determine the amount of coke thereon. Based upon other experiments wherein the sulfur content of the coke deposited upon the catalyst particles utilized to treat the feedstock of Table I was found to be about the same as that of the feedstock itself, the sulfur content of the coke on the catalyst particles herein was assumed to be about 1.17 wt.%. The data obtained from analyzing the flue gas for $SO_x$, $CO_2$, and CO are shown in Table II. Also shown in Table II are data pertaining to the proportion of coke on the spent catalyst (CSC) entering the regenerator, the proportion of coke on the regenerated catalyst particles (CRC) leaving the regenerator, and the calculated difference between the proportion of coke on the spent catalyst particles and that on the regenerated catalyst ($\Delta C$).

A second experiment was performed in a manner similar to the first except that (1) 15% by weight of the catalyst particles were replaced with an equivalent weight of bastnaesite particles having an average size of 28.6 microns and (2) the feed rate of the feedstock was somewhat lowered to maintain the same catalyst to oil ratio as in the first experiment. Data obtained in the second experiment are tabulated in Table II, and as shown, the $SO_x$ and CO emissions were slightly reduced in comparison to the emissions produced in the first experiment.

Because it was believed that the relatively poor performance in the second experiment was due to the presence of too much coke (high CRC) on the bastnaesite particles recovered from the regenerator and that therefore the surfaces of the bastnaesite were not adequately exposed to the gases produced in the regenerator, a third experiment was performed similar to the second except that the conditions of the regenerator were slightly changed to add more air to support combustion and consume more of the coke (lower the CRC) on the catalyst and bastnaesite particles. The data obtained from the third experiment are presented in Table II, and as shown, a remarkable improvement in $SO_x$ and CO removal was found. Despite the fact that more coke was burned in the regenerator per pass during the third experiment than in the second experiment (thereby consequently releasing more $SO_x$ and $CO_x$ compounds than in the second experiment), the proportion of $SO_x$ compounds and the proportion of CO in the flue gas was much lower in the third experiment than in the second experiment.

In view of the data shown in Table II, it is apparent when the proportion of coke on the regenerated catalyst and bastnaesite particles is reduced to low levels that the bastnaesite particles become more efficient for scavenging $SO_x$ and also more efficient for catalyzing the oxidation of CO. For different catalysts, of course, the low proportion of coke required to provide such high reductions in $SO_x$ and CO will vary but normally will be less than about 0.2 catalyst weight percent. Accordingly, it is a specific embodiment of the invention to utilize bastnaesite particles in a cyclic cataltyic cracking unit and to so operate the regenerator associated therewith that the proportion of coke on the catalyst particles leaving the regenerator (CRC) is less than about 0.2 catalyst weight percent, preferably less than about 0.15 catalyst weight percent.

TABLE I

| FEEDSTOCK ANALYSIS | | | |
|---|---|---|---|
| | | ASTM Distillation D1160 Volumetric Cut | °F. |
| Gravity, °API | 23.1 | | |
| Sulfur, Wt. % | 1.17 | 1/5 | 316/476 |
| Conradsen Carbon, Wt. % | 0.12 | 10/20 | 541/641 |
| Ramsbottom Carbon, Wt. % | 0.17 | 30/40 | 693/738 |
| Nitrogen, Wt. % | 0.300 | 50/60 | 774/806 |
| Arsenic, ppmw | <0.5 | 70/80 | 838/869 |
| Aniline Point, °F., D611 | 151 | 90/95 | 911/947 |
| Bromine No. Elect. | 12.3 | Maximum Recovery, Vol. % | 1002 98.9 |

TABLE II

| | First Experiment | Second Experiment | Third Experiment[1] |
|---|---|---|---|
| Composition of Circulating Particles | 100% HEZ-53 Catalyst | 15% Bastnaesite and 85% HEZ-53 Catalyst | 15% Bastnaesite and 85% HEZ-53 Catalyst |
| Flue Gas Composition | | | |
| $SO_x$, ppmv | 700 | 640 | 140 |
| CO, vol. % | 1.30 | 1.25 | 0.9 |
| $CO_2$, vol. % | 7.5 | 8.5 | 8.6 |
| $CO_2$:CO | 5.8 | 6.8 | 9.5 |
| Coke on Spent Catalyst (CSC), Catalyst Wt. % | 0.93 | 0.79 | 0.73 |
| Coke on Regenerated Catalyst (CRC), Catalyst Wt. % | 0.25 | 0.25 | 0.10 |
| $\Delta C$ (CSC − CRC) | 0.68 | 0.54 | 0.63 |

[1] When the third experiment was continued at a later point in time, initial $SO_x$ concentration was 115 ppmv, the CO concentration was 1.0 vol. %, and the $CO_2$:CO ratio was 9.4.

In an alternative embodiment of the invention, the bastnaesite particles are physically embodied into the cracking catalyst particles. Thus, where the typical cracking catalyst particles comprise a crystalline aluminosilicate zeolite dispersed in an inorganic refractory oxide matrix, the catalyst of the invention will further comprise bastnaesite particles dispersed in the refractory oxide matrix. Illustrative of this embodiment of the invention is a cracking catalyst comprising particles of bastnaesite and particles of a rare earth stabilized Y zeolite dispersed in larger particles of silica-alumina.

In non-preferred embodiments of the invention, the catalyst utilized in the FCC unit is modified so as to comprise bastnaesite particles dispersed in a refractory oxide matrix, with no crystalline aluminosilicate zeolites also dispersed therein. Such catalysts particles will usually have substantially lower cracking activity and lower selectivity than is the case for catalysts containing crystalline aluminosilicates.

The method by which the bastnaesite particles are dispersed in or otherwise intimately bound to the inorganic refractory oxide is not critical and may easily be accomplished by making minor changes in the method of preparing conventional cracking catalyst particles. For example, in commercial practice wherein a catalyst comprising a crystalline aluminosilicate zeolite dispersed in an inorganic refractory oxide matrix is desired, the preparation procedure usually involves subjecting a slurry of zeolite particles, inorganic refractory oxide particles, and an appropriate binder material in an aqueous medium to spray drying. The slurry usually comprises about 18% solids, and the spray drying procedure is designed to produce a catalyst having a desired zeolite to refractory oxide ratio and, more importantly, a catalyst of desired particulate size. In accordance with the invention, however, the foregoing slurry is modified so that, upon spray drying, the bastnaesite particles are physically incorporated into the particulate aggregates also containing the refractory oxide and the zeolite particles. Usually, sufficient of the bastnaesite particles are included in the slurry such that the resulting catalyst contains between about 1.0 to 20% by weight of bastnaesite, with the remainder comprising one or more porous, inorganic refractory oxides and, preferably, further comprising one or more crystalline aluminosilicates having activity for cracking hydrocarbons at temperatures of about 750° to 1150° F. Preferred catalysts of the invention comprise 5.0 to 20% by weight bastnaesite, 5 to 20% by weight crystalline aluminosilicate zeolite, and the balance a porous, inorganic refractory oxide.

Bastnaesite-containing cracking catalysts made by the foregoing procedure or by other methods readily apparent to those skilled in the art are utilized in an FCC unit under appropriate conditions to effect the intended hydrocarbon conversions in the catalytic cracking reaction zone. When the cracking catalyst particles become coked and are passed to the regeneration zone, the presence of the bastnaesite in the cracking catalyst reduces CO and $SO_x$ emissions, with the latter especially being reduced when the coke content of the catalyst particles recovered from the regeneration step is less than about 0.2 catalyst weight percent.

Although the invention has been described in conjunction with preferred and alternative embodiments thereof, it is evident that many alternatives, modifications, and variations of the invention will be apparent to those skilled in the art in light of the foregoing description. Accordingly, it is intended to embrace within the invention all such alternatives, modifications, and variations that fall within the spirit and scope of the appended claims.

We claim:

1. In a process for regenerating cracking catalyst particles having sulfur-containing coke on the surfaces thereof by combusting said coke in the presence of oxygen and at elevated temperatures so as to remove sufficient coke from the surfaces of said catalyst particles so as to reactivate said catalyst particles for cracking hydrocarbons while producing a flue gas containing one or more pollutant gases selected from the group consisting of $SO_x$ and CO, the improvement for reducing the amount of at least one of said pollutant gases carried with said flue gas comprising:
   (1) introducing into a regeneration zone a feed admixture of catalyst particles deactivated with coke and bastnaesite particles containing natural bastnaesite or a treated natural bastnaesite containing a rare earth fluorocarbonate or rare earth oxyfluoride after use of said admixture in a catalytic cracking reaction zone wherein hydrocarbons are cracked to produce product hydrocarbons of lower average molecular weight and boiling point;
   (2) combusting, in said regeneration zone, a substantial proportion of the coke on said catalyst particles admixed with said bastnaesite particles; and
   (3) withdrawing a product admixture of bastnaesite particles and regenerated cracking catalyst particles from said regeneration zone, said product admixture being more active for cracking hydrocarbons than said feed admixture.

2. A process as defined in claim 1 wherein the temperature in said regeneration zone is between about 900° and 1400° F.

3. A process as defined in claim 1 wherein (1) said catalyst particles comprise a crystalline aluminosilicate zeolite having activity for cracking hydrocarbons at a temperature above about 750° F. and (2) said bastnaesite is in the form of particles having an average diameter between about 20 to 80 microns.

4. A process as defined in claim 1 wherein said bastnaesite and catalyst particles withdrawn from said regeneration zone contain, on the average, less than about 0.2 catalyst weight percent of coke.

5. A process as defined in claim 1, 2, 3, or 4 wherein said bastnaesite particles are physically embodied into the catalyst particles.

6. A process as defined in claim 5 wherein said bastnaesite particles comprise about 1.0 to 20% by weight of both the feed and product admixture of catalyst and bastnaesite.

7. A process as defined in claim 5 wherein said catalyst particles comprise a crystalline aluminosilicate zeolite containing rare earth ions exchanged thereinto, said zeolite being dispersed in a matrix of an inorganic refractory oxide.

8. In a process for regenerating cracking catalyst particles having sulfur-containing coke on the surfaces thereof by combusting said coke in the presence of oxygen and at elevated temperatures so as to remove sufficient coke from the surfaces of said catalyst particles so as to reactivate said catalyst particles for cracking hydrocarbons while producing a flue gas containing one or more $SO_x$ compounds, the improvement for reducing the amount of said $SO_x$ compounds carried with said flue gas comprising:
   (1) introducing into a regeneration zone a feed admixture of catalyst particles deactivated with coke and particles containing natural bastnaesite after use of said admixture in a catalytic cracking reaction zone wherein hydrocarbons are cracked to produce product hydrocarbons of lower average molecular weight and boiling point;
   (2) combusting, in said regeneration zone, a substantial proportion of the coke on said catalyst particles admixed with said particles of natural bastnaesite; and (3) withdrawing a product admixture of bastnaesite particles and regenerated cracking catalyst particles, said product admixture being more active for cracking hydrocarbons than said feed admixture.

9. In a process for regenerating cracking catalyst particles having coke on the surfaces thereof by combusting said coke in the presence of oxygen and at elevated temperatures so as to remove sufficient coke from the surfaces of said catalyst particles so as to reactivate said catalyst particles for cracking hydrocarbons while producing a flue gas containing CO, the improvement for reducing the amount of CO carried with said flue gas comprising:

(1) introducing into a regeneration zone a feed admixture of catalyst particles deactivated with coke and particles containing natural bastnaesite after use of said admixture in a catalytic cracking reaction zone wherein hydrocarbons are cracked to produce product hydrocarbons of lower average molecular weight and boiling point;

(2) combusting, in said regeneration zone, a substantial proportion of the coke on said catalyst particles admixed with said particles of natural bastnaesite; and (3) withdrawing a product admixture of bastnaesite particles and regenerated cracking catalyst particles from said regeneration zone, said product admixture being more active for cracking hydrocarbons than said feed admixture.

10. In a process for regenerating cracking catalyst particles having sulfur-containing coke on the surfaces thereof by combusting said coke in the presence of oxygen and at elevated temperatures so as to remove sufficient coke from the surfaces of said catalyst particles so as to reactivate said catalyst particles for cracking hydrocarbons while producing a flue gas containing $SO_x$ and CO compounds, the improvement for reducing the amount of both $SO_x$ and CO carried with said flue gas comprising:

(1) introducing into a regeneration zone a feed admixture of catalyst particles deactivated with coke and particles containing natural bastnaesite after use of said admixture in a catalytic cracking reaction zone wherein hydrocarbons are cracked to produce product hydrocarbons of lower average molecular weight and boiling point;

(2) combusting, in said regeneration zone, a substantial proportion of the coke on said catalyst particles admixed with said particles of natural bastnaesite; and (3) withdrawing a product admixture of bastnaesite particles and regenerated cracking catalyst particles from said regeneration zone, said product admixture being more active for cracking hydrocarbons than said feed admixture.

11. A process as defined in claim 8, 9, or 10 wherein said particles containing natural bastnaesite are physically embodied into the catalyst particles.

12. A process as defined in claim 11 wherein the catalyst particles withdrawn from said regeneration zone contain, on the average, less than 0.15 catalyst weight percent of coke.

13. A process as defined in claim 8, 9 or 10 wherein said bastnaesite and catalyst particles withdrawn from said regeneration zone contain, on the average, less than about 0.2 catalyst weight percent of coke.

14. A process as defined in claim 13 wherein said particles containing natural bastnaesite are physically embodied into the catalyst particles.

15. A process as defined in claim 13 wherein the temperature in said regeneration zone is between about 900° and 1400° F.

16. A process as defined in claim 15 wherein said catalyst particles comprise a crystalline aluminosilicate zeolite containing rare earth element ions exchanged thereinto, said zeolite being dispersed in a matrix of an inorganic refractory oxide.

17. A process as defined in claim 1, 8, 9 or 10 wherein said catalyst particles comprise a crystalline aluminosilicate zeolite containing rare earth element ions exchanged thereinto, said zeolite being dispersed in a matrix of an inorganic refractory oxide.

* * * * *